(12) United States Patent
Tayloe et al.

(10) Patent No.: US 6,192,240 B1
(45) Date of Patent: *Feb. 20, 2001

(54) ADVANCED SUBSCRIBER OUTAGE NOTIFICATION METHODS

(75) Inventors: Daniel Richard Tayloe, Phoenix; Michael William Krutz, Chandler, both of AZ (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/489,577

(22) Filed: Jun. 12, 1995

(51) Int. Cl.[7] .................................................. H04Q 7/20

(52) U.S. Cl. ........................... 455/428; 455/437; 455/447

(58) Field of Search .................................. 455/121, 13.1, 455/13.2, 54.2, 33.2, 67.7, 54.1, 427, 428, 429, 430, 436, 437, 447; 379/60, 58, 63, 59

(56) References Cited

U.S. PATENT DOCUMENTS

| | | | |
|---|---|---|---|
| 5,161,248 | * 11/1992 | Bertiger et al. | 455/428 |
| 5,222,248 | * 6/1993 | McDonald et al. | 455/509 |
| 5,287,552 | * 2/1994 | Sasuta et al. | 455/34.1 |
| 5,373,548 | * 12/1994 | McCarthy | 379/62 |
| 5,465,389 | * 11/1995 | Agrawal et al. | 455/437 |

* cited by examiner

Primary Examiner—Edward F. Urban
(74) Attorney, Agent, or Firm—Harold C. McGurk; Frank J. Bogacz

(57) ABSTRACT

Advanced subscriber outage notification methods (100) notify a user of a subscriber unit (30) that its call is going to be dropped. The subscriber unit (30), the satellite (20) or the mobile telecommunication system (10) first predicts whether an outage is going to occur and how much time there is before the outage. Second, the subscriber unit (30) notifies the user of the outage and the time remaining before the outage. Third, the subscriber unit (30) waits for whether the user wants to end the call. Next, the subscriber unit (30), the satellite (20) or the mobile telecommunication system (10) terminates the call if the user wants to end the call. Lastly, the mobile telecommunication system (10) drops the call once the time remaining before the outage expires.

18 Claims, 1 Drawing Sheet

ADVANCED SUBSCRIBER OUTAGE NOTIFICATION METHODS

TECHNICAL FIELD

This invention relates generally to mobile telecommunication methods and, in particular, to space-based mobile telecommunication methods for notifying users in advance of dropping their calls.

BACKGROUND OF THE INVENTION

A space-based mobile telecommunication system is unique from ground-based or terrestrial cellular systems in at least three ways. First, the movement of subscribers from cell to cell is dictated by predictable motions of the satellites and not the movement of individual subscribers as in ground-based telecommunication systems.

Second, it is unique in the aspect of system outages and subsequent repair. A ground-based telecommunication system is accessible by field maintenance personnel who can fix problems as they arise. In contrast, a space-based mobile telecommunication system is prohibitively expensive and impractical to repair by traditional means. When a problem arises on a satellite, someone may have to decide whether the degree of the impairment is greater than the cost of decommissioning the entire satellite and replacing it with a new one. Even if another satellite is available, it may take a significant amount of time to maneuver the spare satellite into the orbit to replace the nonfunctioning satellite. Therefore, there will be coverage holes in the normally global communication coverage provided by the space-based mobile telecommunication system when a satellite becomes non-operational.

Third, space-based mobile telecommunication systems have frequent frequency replanning. In ground-based systems, frequency replanning is often measured on a scale of months. Space-based systems, however, are forced into frequency replanning after a few seconds because of the constantly changing relationship of the satellites to each other and to earth. One of the disadvantages of frequent frequency replanning is that cells undergoing frequency replanning may find that the new frequency plan does not support as much capacity as the old plan. In some cases, this may lead to some calls being terminated for lack of call capacity.

For these reasons, there is a significant need for methods which prewarn a subscriber that its call will shortly be dropped due either to a non-functioning satellite or a reduction in call capacity resources.

DESCRIPTION OF THE PREFERRED EMBODIMENTS

A "satellite" as used throughout this description means a manmade object or vehicle intended to orbit earth and comprises both geostationary and orbiting satellites and/or combinations thereof including low-earth and medium-earth orbiting satellites. A "constellation" means an ensemble of satellites arranged in orbits for providing specified coverage (e.g., radio communication, photogrammetry, etc.) of portion(s) or all of earth. A constellation typically includes multiple rings (or planes) of satellites and may have an equal number of satellites in each plane, although this is not essential. The terms "cell," "beam" and "antenna pattern" are not intended to be limited to any particular mode of generation and include those created by either terrestrial or spaced-based mobile telecommunication systems and/or combinations thereof.

Figure 1:
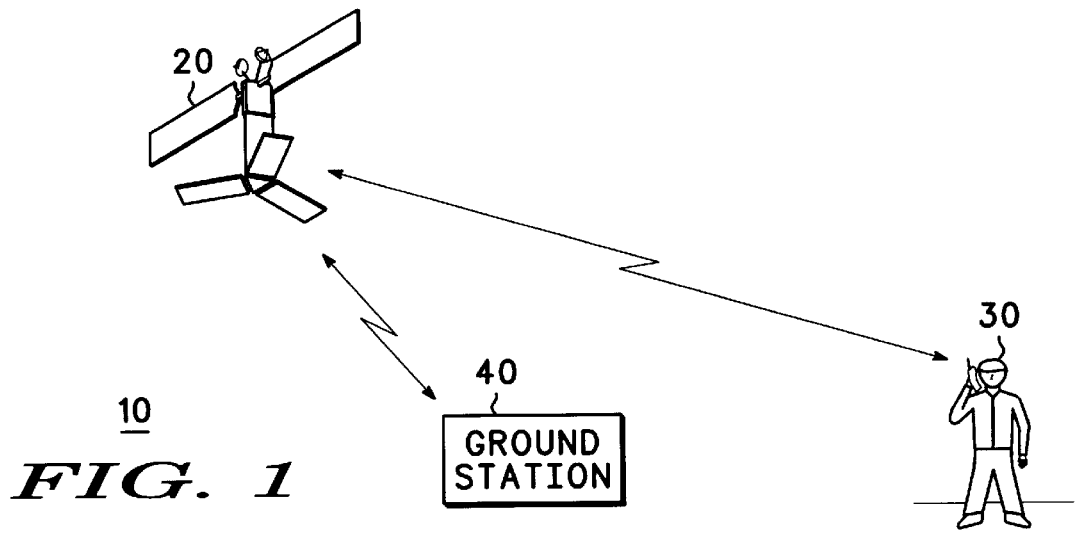
FIG. 1 shows a general view of a space-based mobile telecommunications system according to a preferred embodiment of the present invention.

FIG. 1 shows a general view of a space-based mobile telecommunication system 10 according to a preferred embodiment of the present invention. Although FIG. 1 illustrates a highly simplified diagram of mobile telecommunication system 10, system 10 comprises at least one satellite 20, any number of subscriber units 30 and at least one ground station 40.

The present invention is applicable to mobile telecommunication systems 10 having at least one satellite 20 in low-earth, medium-earth or geosynchronous orbit. Satellite 20 is preferably a satellite in low-earth orbit around earth. Satellite 20 may be a single satellite or one of many satellites in a constellation of satellites orbiting earth, like the IRIDIUM® system which has a constellation of sixty-six satellites in low-earth orbits. The present invention is also applicable to mobile telecommunication systems 10 having satellites 20 which orbit earth at any angle of inclination (e.g., polar, equatorial or another orbital pattern). The present invention is applicable to systems 10 where full coverage of the earth is not achieved (i.e., where there are "holes" in the communication coverage provided by the constellation) and to systems 10 where plural coverage of portions of the earth occur (i.e., more than one satellite is in view of a particular point on earth's surface).

Satellites 20 communicate with other nearby or adjacent satellites 20 through cross-links. Thus, a call or communication from subscriber unit 30 located at any point on or near the surface of the earth may be routed through the constellation of satellites 20 to within range of substantially any other point on the surface of the earth. A communication may be routed down to subscriber unit 30 or near the surface of the earth from satellite 20. Accordingly, mobile telecommunication system 10 may establish a communication path for relaying data through the constellation of satellites 20 between any two subscriber units 30 located almost anywhere on or near the surface of the earth.

Satellite 20 communicates with and are controlled by at least one ground station 40. Ground station 40 provides satellite control commands to satellite 20 so that it maintains its proper position in its orbit and other house-keeping tasks. Moreover, ground station 40 may be connected to public switched telephone networks (PSTNs) and may provide a link between the PSTNs and satellite 20.

Subscriber units 30 may be located anywhere on the surface of earth or in the atmosphere above earth (e.g., in an jet). Mobile telecommunication system 10 may accommodate any number of subscriber units 30. Subscriber units 30 are preferably communication devices capable of transmitting voice and/or data to and receiving voice and/or data from satellites 20. By way of example, subscriber units 30 may be hand-held, portable cellular telephones adapted to communicate with satellites 20, or it may be a facsimile device. Subscriber units 30 may also be a dual mode cellular telephone which can transmit to and receive from satellite 20 and terrestrial cellular systems or equipment. Ordinarily, subscriber units 30 need not perform any control functions for mobile telecommunication system 10. Subscriber units 30 comprise hardware which is well known to those of ordinary skill in the art for communicating with satellite 20.

How subscriber units 30 physically transmit data (or calls) to and receive data (or calls) from satellites 20 is well known to those of ordinary skill in the art. In the preferred embodiment of the present invention, subscriber units 30 communicate with nearby satellites 20 using a limited portion of the electromagnetic spectrum that is divided into numerous channels (e.g., ring-alert channels, broadcast channels, acquisition channels and traffic channels). The channels are preferably combinations of L-Band and/or K-Band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Figure 2:
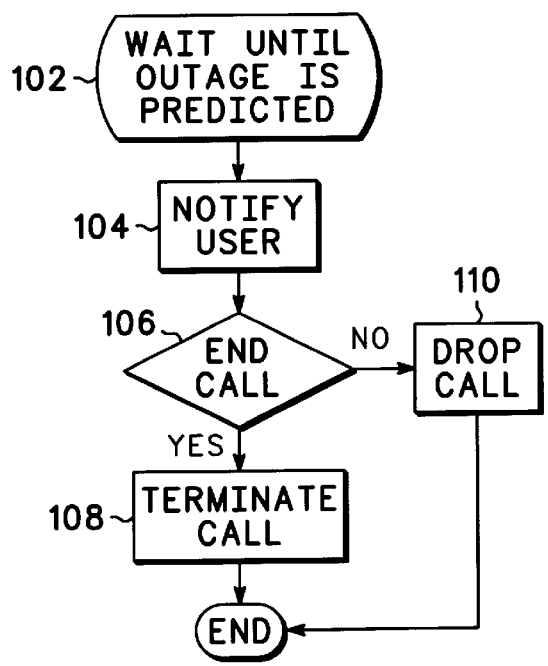
FIG. 2 shows a flowchart of a method for advanced user outage notification according to a preferred embodiment of the present invention.

FIG. 2 shows a flowchart of method 100 for advanced user outage notification according to a preferred embodiment of the present invention. Generally, method 100 waits in step 102 until an outage is predicted and notifies a user through subscriber unit 30 in step 104 that an outage is imminent. The user of subscriber unit 30 then chooses in step 106 whether to end the call or not. If subscriber unit 30 ends the call, the call terminates in step 108. Otherwise the call continues until it is dropped in step 110. A detailed description of each of the steps is discussed below.

According to FIG. 2, method 100 waits in step 102 until an outage is going to occur (or predicted to occur). An outage is predicted to occur either by satellite 20 or subscriber unit 30 in a variety of ways. One way is for subscriber unit 30 to determine whether there are no other available cells to which it can handoff. For example, satellite 20 may provide subscriber unit 30 with a list of upcoming candidate handoff cells that are currently out-of-service. Subscriber unit 30 then scans the list to determine if all up-coming candidates are out-of-service such that an outage will occur.

Figure 3:
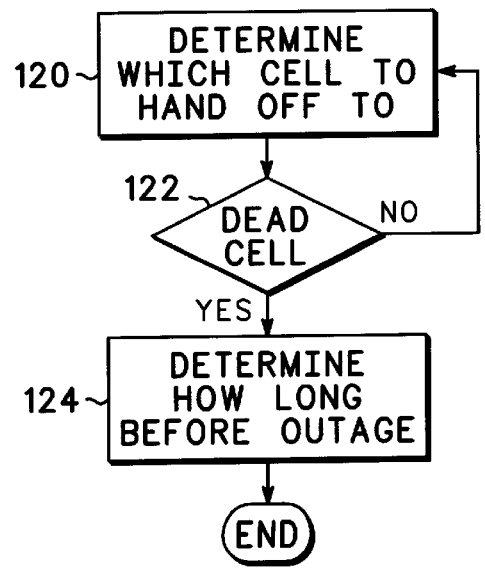
FIG. 3 shows a flowchart of a process for predicting when an outage will occur according to a preferred embodiment of the present invention.

Another way to determine whether an outage is going to occur is shown in FIG. 3. As shown in FIG. 3, subscriber unit 30 determines in step 120 to which cell it is going to handoff. This determination is based on its current position on earth, the relative position of the satellite cells and their size, shape and location. This information is provided from satellite 20 to subscriber unit 30 so that subscriber unit 30 can calculate to which cell it has to handoff. Subscriber unit 30 then determines in step 122 whether the cell it is going to handoff to is a dead cell (i.e., a cell that cannot service the call of subscriber unit 30 because it is overloaded, out-of-service or out of radio contact). If the cell is not dead, the process returns to step 120.

If the cell is dead as determined in step 122 of FIG. 3, subscriber unit 30 then determines in step 124 how much time there is before the outage or the handoff to the dead cell is going to occur. This time can be used to inform the user of subscriber unit 30 of how long before an outage is going to occur. The process ends after step 124.

There are other ways for determining whether an outage is going to occur that are well known to those of ordinary skill in the art other than the processes described above. Returning to FIG. 2, once an outage is going to occur, subscriber unit 30 notifies the user. The user may either be human or a machine (e.g., modem used in data transfer). If the user is a human, a message may be played to indicate that an outage is imminent. The message may also state the time remaining so that the user knows how much time remains before the call is dropped. The message may be also broadcasted, emitted, flashed or vibrated to the user. Moreover, the message may be a pre-recorded message, a sound or sounds, vibration, a light or other ways known to those of ordinary skill in the art.

In step 106 of FIG. 2, the user is given the option to end the call before it is dropped. This takes place by the user finishing talking (i.e., saying good-bye) and pressing the call release button (or similar button) on subscriber unit 30 to end the call, for example. There are other ways than pressing the call release button to terminate the call on subscriber unit 30 that are well known to those of ordinary skill in the art. If the user chooses to end the call in step 106, the call is gracefully terminated in step 108 using call termination procedures well known to those of ordinary skill in the art. If the user does not choose to end the call in step 106, the call will eventually be dropped in step 110 when the handoff to a dead cell occurs. How a call is dropped is well known to those of ordinary skill in the art. Method 100 then ends after either step 108 or step 110.

An alternative embodiment of FIG. 2 is when satellite 20 finds that it does not have enough call capacity resources to keep all calls active due to frequency replanning or other resource adjustments, satellite 20 sends the affected subscriber units 30 a warning message to give its users some advance notice before dropping their calls. Subscriber units 30 will attempt to handoff to another beam if possible. If the handoff request is rejected, subscriber unit 30 may warn the user that it appears the call will be dropped. If a subscriber unit's 30 call is dropped, satellite 20 may send a message to a ground station to credit those users some amount for the system dropping their calls.

It is preferred that the warning messages generated when an outage is predicted to occur, a handoff is rejected and other situations be different or unique from each other. This would help the user understand the source of the interruption and deal with whatever situation arises.

It will be appreciated by those skilled in the art that the present invention provides a way of indicating to a user that an upcoming outage is imminent (whether due to a system or satellite failure or a lack of call capacity resources). Another advantage of the present invention is that a user has time to end a call gracefully rather than be unexpectantly dropped.

Accordingly, it is intended by the appended claims to cover all modifications of the invention which fall within the true spirit and scope of the invention. For example, these methods are applicable to terrestrial cellular systems, although the methods are described in relation to space-based mobile telecommunication systems 10.

What is claimed is:

1. An advanced subscriber outage notification method for notifying a user of a subscriber unit of its call being dropped, the method comprising the steps of:

a) predicting that there are no available cells to which the call can be handed-off resulting in an outage, the prediction being based on a satellite determining that it does not have enough call capacity resources to keep the call active due to frequency replanning;

b) determining how much time there is before the outage;

c) notifying the user of the subscriber unit of the outage and an amount of time before the outage will occur; and d) terminating the call if the user wants to end the call or the amount of time expires.

2. A method as recited in claim 1, further comprising the step of dropping the call if the user did not end the call and the outage is simultaneously occurring.

3. A method as recited in claim 1, wherein step (a) includes the step of determining whether there are no other available cells to which the subscriber unit can handoff.

4. A method as recited in claim 1, wherein step (a) includes the step of a satellite notifying the subscriber unit of cells that are out-of-service.

5. A method as recited in claim 1, wherein step (a1) includes the sub-step of determining to what cell to handoff based on the subscriber unit's current position, relation position of the cells to the subscriber unit, and size, shape and location of the cells.

6. A method as recited in claim 1, wherein step (a) includes the step of determining how much time there is before the outage.

7. A method as recited in claim 1, wherein step (b) includes the step of the subscriber unit broadcasting a prerecorded message to the user to notify the user of the outage.

8. A method as recited in claim 1, wherein step (b) includes the step of vibrating the subscriber unit to notify the user of the outage.

9. A method as recited in claim 1, wherein step (b) includes the step of the subscriber unit emitting a sound to notify the user of the outage.

10. A method as recited in claim 1, wherein step (b) includes the step of the subscriber unit stating time remaining before the outage to the user.

11. A method as recited in claim 1, wherein step (c) includes the step of pressing a call release button on the subscriber unit once the call is completed.

12. An advanced subscriber outage notification method for notifying a user of a subscriber unit of its call being dropped by a satellite, the method comprising the step of:

a) a satellite predicting that there are no available cells to which the call can be handed-off resulting in an outage, the prediction being based on the satellite determining that it does not have enough call capacity resources to keep the call active due to frequency replanning;

b) determining how much time there is before the outage;

c) the satellite notifying the subscriber unit of the outage;

d) the subscriber unit determining an amount of time before the outage will occur;

e) the subscriber unit notifying the user of the outage; and f) the subscriber unit and satellite terminating the call if the user wants to end the call or the amount of time expires.

13. An advanced subscriber outage notification method executed by a subscriber unit for notifying a user of the subscriber unit of its call being dropped, the method comprising the step of:

a) the subscriber unit predicting that there are no available cells to which the call can be handed-off resulting in an outage, the prediction being based on a satellite determining that it does not have enough call capacity resources to keep the call active due to frequency replanning;

b) the subscriber unit determining an amount of time before the outage will occur;

c) the subscriber unit notifying the user of the outage; and d) the subscriber unit terminating the call if the user wants to end the call or the amount of time expires.

14. An advanced subscriber outage notification method for notifying a user of the subscriber unit of its call being dropped, the method comprising the step of:

a) the subscriber unit predicting that there are no available cells to which the call can be handed-off resulting in an outage and an amount of time there is before the outage, the prediction being based on a satellite determining that it does not have enough call capacity resources to keep the call active due to frequency replanning;

b) determining how much time there is before the outage;

c) the subscriber unit notifying the user of the outage and the amount of time remaining before the outage;

d) the subscriber unit terminating the call if the user wants to end the call; and e) the satellite dropping the call once the amount of time expires.

15. A method as recited in claim 14, wherein step (b) includes the step of the subscriber unit playing a prerecorded message to the user to notify the user of the outage.

16. A method as recited in claim 14, wherein step (b) includes the step of vibrating the subscriber unit to notify the user of the outage.

17. A method as recited in claim 14, wherein step (b) includes the step of the subscriber unit emitting a sound to notify the user of the outage.

18. A method as recited in claim 14, wherein step (c) includes the step of the user pressing a call release button on the subscriber unit once the call is finished.

* * * * *

UNITED STATES PATENT AND TRADEMARK OFFICE
CERTIFICATE OF CORRECTION

PATENT NO.  : 6,192,240 B1
DATED       : February 20, 2001
INVENTOR(S) : Daniel R. Tayloe et al.

It is certified that error appears in the above-identified patent and that said Letters Patent is hereby corrected as shown below:

<u>Column 5,</u>
Line 16, delete "relation" and add -- relative --.

Signed and Sealed this

Twenty-eighth Day of May, 2002

*Attest:*

*Attesting Officer*

JAMES E. ROGAN
*Director of the United States Patent and Trademark Office*